(12) United States Patent
Tanimoto (10) Patent No.: US 11,626,606 B2
(45) Date of Patent: Apr. 11, 2023

(54) FUEL CELL VEHICLE AND METHOD OF OPERATING THE SAME

(71) Applicant: HONDA MOTOR CO., LTD., Tokyo (JP)

(72) Inventor: Satoshi Tanimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/531,101

(22) Filed: Nov. 19, 2021

(65) Prior Publication Data

US 2022/0166036 A1    May 26, 2022

(30) Foreign Application Priority Data

Nov. 26, 2020  (JP) .............................. JP2020-195699

(51) Int. Cl.
| | | |
|---|---|---|
| H01M 8/04 | (2016.01) | |
| H01M 8/04858 | (2016.01) | |
| H01M 8/04029 | (2016.01) | |
| H01M 8/04701 | (2016.01) | |
| H01M 8/04291 | (2016.01) | |
| H01M 8/04828 | (2016.01) | |

(52) U.S. Cl.
CPC ..... *H01M 8/0494* (2013.01); *H01M 8/04029* (2013.01); *H01M 8/0491* (2013.01); *H01M 8/04291* (2013.01); *H01M 8/04731* (2013.01); *H01M 8/04828* (2013.01); *H01M 2250/20* (2013.01)

(58) Field of Classification Search
CPC ........... H01M 8/0494; H01M 8/04029; H01M 8/04291; H01M 8/04731
See application file for complete search history.

(56) References Cited

U.S. PATENT DOCUMENTS

| | | |
|---|---|---|
| 10,780,787 B2 | 9/2020 | Bandai et al. |
| 2011/0022305 A1 | 1/2011 | Okamoto |
| 2020/0136157 A1* | 4/2020 | Ito ..................... H01M 8/04753 |

FOREIGN PATENT DOCUMENTS

| | | |
|---|---|---|
| JP | 2009-046020 A | 3/2009 |
| JP | 2009-250621 A | 10/2009 |
| JP | 2012-209109 A | 10/2012 |
| JP | 2013-239351 A | 11/2013 |
| JP | 2014-007097 A | 1/2014 |
| JP | 2018-137900 A | 8/2018 |

OTHER PUBLICATIONS

Office Action dated May 31, 2022 issued over the corresponding Japanese Patent Application No. 2020-195699 with an English translation of pertinent portion.

* cited by examiner

*Primary Examiner* — Olatunji A Godo
(74) *Attorney, Agent, or Firm* — Carrier Shende & Associates, P.C.; Fulchand P. Shende; Joseph P. Carrier (57) ABSTRACT

An ECU of a fuel cell vehicle determines whether the vehicle travels on an uphill road or not. When determining that the vehicle travels on the uphill road, the ECU performs at least one of a temperature reduction control for reducing the temperature of a fuel cell stack and a humidification control for increasing the water content of the fuel cell stack, by the time the vehicle reaches the uphill road.

13 Claims, 6 Drawing Sheets

FUEL CELL VEHICLE AND METHOD OF OPERATING THE SAME

CROSS-REFERENCE TO RELATED APPLICATIONS

This application is based upon and claims the benefit of priority from Japanese Patent Application No. 2020-195699 filed on Nov. 26, 2020, the contents of which are incorporated herein by reference.

BACKGROUND OF THE INVENTION

Field of the Invention

The present invention relates to a fuel cell vehicle equipped with a fuel cell system including a fuel cell stack including a plurality of power generation cells stacked together, the power generation cells generating electric power by an electrochemical reaction of a fuel gas and an oxygen-containing gas, the fuel cell vehicle traveling by electric power generated by the fuel cell system, and a method of operating the fuel cell vehicle.

Description of the Related Art

For example, a solid polymer electrolyte fuel cell includes a membrane electrode assembly (MEA). The membrane electrode assembly includes an electrolyte membrane made of a polymer ion exchange membrane. An anode is disposed on one surface of the electrolyte membrane. A cathode is disposed on the other surface of the electrolyte membrane. The membrane electrode assembly is sandwiched between separators to form a power generation cell (unit cell). Usually, a predetermined number of power generation cells are stacked to form an in-vehicle fuel cell stack. For example, an in-vehicle fuel cell stack is mounted on a fuel cell vehicle (such as a fuel cell electric vehicle). In the fuel cell vehicle, a motor is driven by electric power generated by the fuel cell stack, and wheels are rotated by the driven motor, thereby causing the vehicle to travel.

In a fuel cell vehicle, in order to suppress a decrease in vehicle speed during traveling on an uphill road, it is necessary to supply more electric power to the motor in the case of traveling on an uphill road than in the case of traveling on a flat road. At this time, if the generated power of the fuel cell stack is increased, the temperature of the fuel cell stack rises and the water content decreases. From the viewpoint of suppressing deterioration of the fuel cell stack, it is desirable to suppress an increase in the temperature of the fuel cell stack or a decrease in the water content.

A control device disclosed in JP 2009-046020 A suppresses a temperature rise of a fuel cell stack by reducing power generated by the fuel cell stack during traveling on an uphill road. Further, the control device increases electric power supplied from the battery to the motor to thereby prevent a decrease in vehicle speed.

SUMMARY OF THE INVENTION

The control device disclosed in JP 2009-046020 A increases power supplied from the battery to the motor instead of increasing power generated by the fuel cell stack. However, when the SOC (State of Charge) of the battery becomes equal to or less than a predetermined amount, the electric power supplied from the battery to the motor cannot be increased. As a result, the electric power supplied to the motor decreases, so that the vehicle speed is limited.

An object of the present invention is to solve the above problems.

According to a first aspect of the present invention, there is provided a method of operating a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system, the method including: determining whether the fuel cell vehicle travels on an uphill road or not; and if it is determined in the determining that the fuel cell vehicle travels on the uphill road, performing at least one of a temperature reduction control and a humidification control by a time the fuel cell vehicle reaches the uphill road, wherein the temperature reduction control is a control of reducing a temperature of the fuel cell stack so as to be less than the temperature before start of the control and the humidification control is a control of increasing a water content of the fuel cell stack so as to be greater than the water content before start of the control.

According to a second aspect of the present invention, there is provided a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system. The fuel cell vehicle includes: a determination unit configured to determine whether the fuel cell vehicle travels on an uphill road or not; and a control unit configured to, if the determination unit determines that the fuel cell vehicle travels on the uphill road, perform at least one of a temperature reduction control and a humidification control by the time the fuel cell vehicle reaches the uphill road, wherein the temperature reduction control is a control of reducing a temperature of the fuel cell stack so as to be less than the temperature before start of the control and the humidification control is a control of increasing a water content of the fuel cell stack so as to be greater than the water content before start of the control.

According to the present invention, it is possible to prevent the vehicle speed from being limited during traveling on an uphill road while protecting the fuel cell stack.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

1. Configuration of Fuel Cell Vehicle 10

Figure 1:
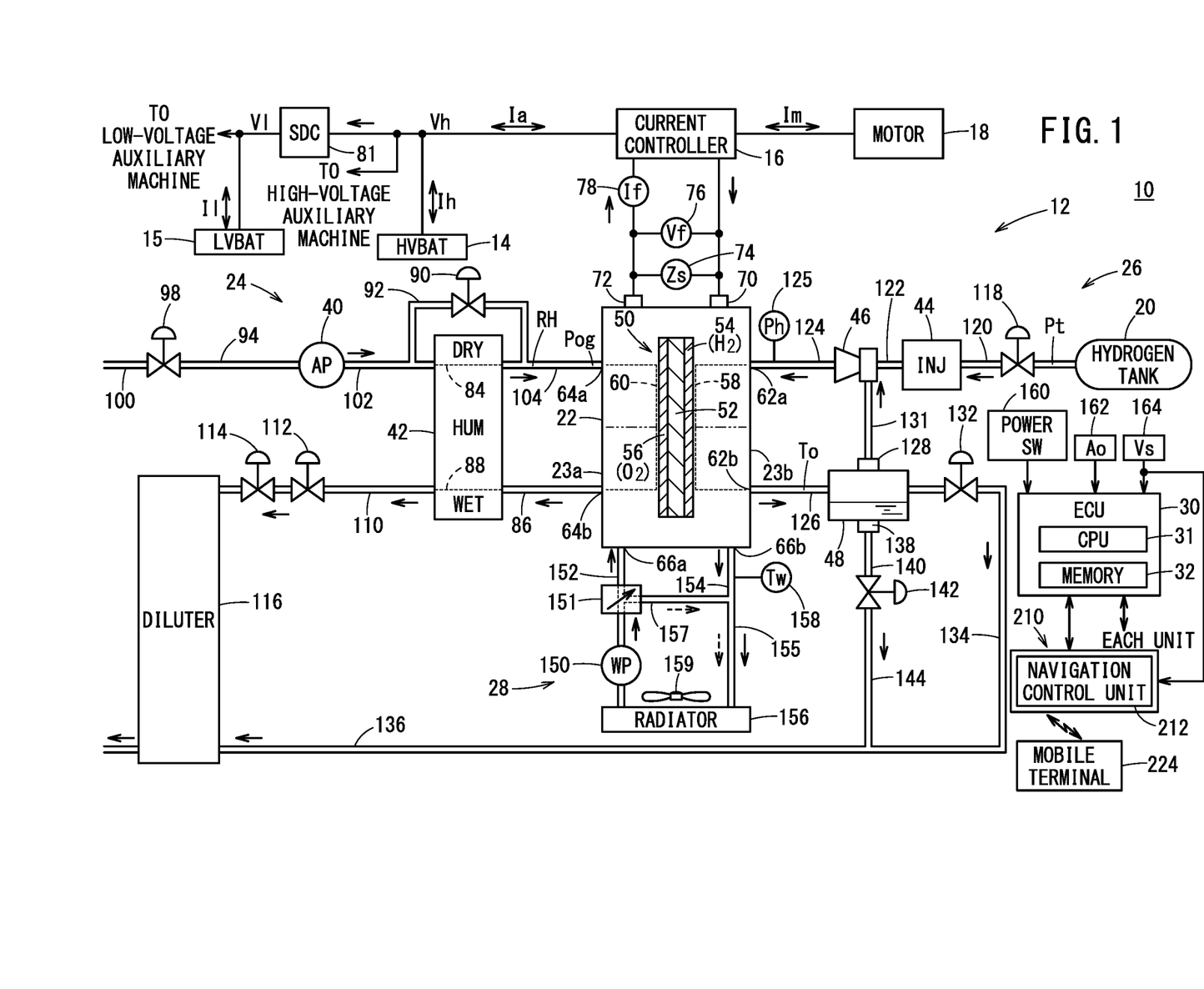
FIG. 1 is a schematic configuration explanatory view of a fuel cell vehicle according to the present embodiment.
Figure 2:
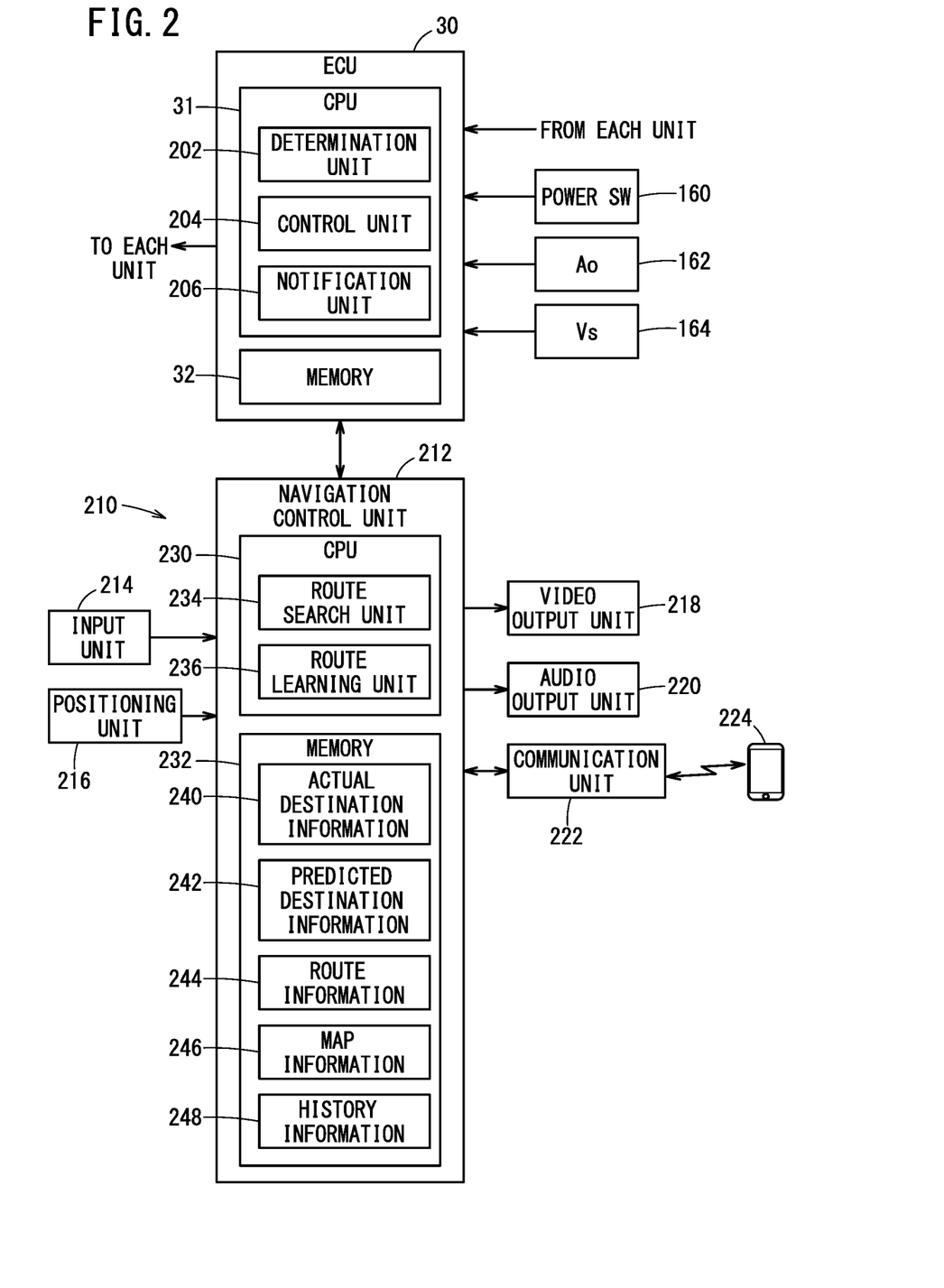
FIG. 2 is a functional block diagram of an ECU and a navigation device.

FIG. 1 is a schematic configuration explanatory view of a fuel cell vehicle 10 according to the present embodiment; FIG. 2 is a functional block diagram of an ECU 30 and a navigation device 210. The fuel cell vehicle 10 is also simply referred to as a vehicle 10. As shown in FIG. 1, the fuel cell vehicle 10 is, for example, a fuel cell electric vehicle.

The fuel cell vehicle 10 basically includes a fuel cell system 12, a high-voltage capacitor (HVBAT) 14, a current controller 16, a motor (electric motor for driving the vehicle) 18, a high-pressure hydrogen tank 20, and the ECU 30. The capacitor 14 is also referred to as a high-voltage battery 14. The high-voltage battery 14 includes a secondary battery, a capacitor, and the like.

The ECU 30 functions as various functional units by a processor (CPU) 31 executing a program stored in a memory (storage device) 32. For example, as illustrated in FIG. 2, the ECU 30 functions as a determination unit 202, a control unit 204, a notification unit 206, and the like.

In FIGS. 1 and 2, the ECU 30 takes in data from a navigation control unit 212 and data from each unit of the fuel cell vehicle 10. The ECU 30 controls the fuel cell system 12 and each unit of the fuel cell vehicle 10, thereby controlling the entire fuel cell vehicle 10.

The navigation device 210 is wirelessly connected to a mobile terminal 224 such as a smartphone brought into the vehicle 10 by an occupant.

As shown in FIG. 1, the fuel cell system 12 includes a fuel cell stack (fuel cell) 22, an oxygen-containing gas system 24, a fuel gas system 26, and a coolant supply system 28.

The oxygen-containing gas system 24 supplies oxygen-containing gas to the fuel cell stack 22. The fuel gas system 26 supplies fuel gas to the fuel cell stack 22. The coolant supply system 28 supplies a coolant to the fuel cell stack 22.

The oxygen-containing gas system 24 includes an air pump (AP) 40 and a humidifier (HUM) 42. The fuel gas system 26 includes an injector (INJ) 44, an ejector 46, and a gas-liquid separator 48.

In the fuel cell stack 22, a plurality of power generation cells 50 are stacked between an end plate 23a and an end plate 23b. Each power generation cell 50 includes a solid polymer electrolyte membrane 52, an anode 54, a cathode 56, and a pair of separators (not shown). For example, the solid polymer electrolyte membrane 52 is a thin membrane of perfluorosulfonic acid containing water. The solid polymer electrolyte membrane 52 is held and sandwiched between the anode 54 and the cathode 56. The solid polymer electrolyte membrane 52, the anode 54, and the cathode 56 form a membrane electrode assembly (MEA). The membrane electrode assembly (MEA) is sandwiched between a pair of separators (not shown). As the solid polymer electrolyte membrane 52, an HC (hydrocarbon) based electrolyte is used, in addition to a fluorine-based electrolyte.

An anode flow field 58 through which hydrogen (fuel gas) flows is formed in the separator disposed near the anode 54.

A cathode flow field 60 through which air (oxygen-containing gas) flows is formed in the separator disposed near the cathode 56.

The fuel cell stack 22 is provided with a fuel gas inlet passage 62a and a fuel gas outlet passage 62b. The fuel gas inlet passage 62a supplies a fuel gas (for example, hydrogen gas) to the anode 54 via the anode flow field 58.

The fuel cell stack 22 is provided with an oxygen-containing gas inlet passage 64a and an oxygen-containing gas outlet passage 64b. The oxygen-containing gas inlet passage 64a supplies an oxygen-containing gas (e.g., air) to the cathode 56 through the cathode flow field 60.

The fuel cell stack 22 is further provided with a coolant inlet passage 66a and a coolant outlet passage 66b. The coolant inlet passage 66a and the coolant outlet passage 66b allow coolant to flow through each power generation cell 50.

When the fuel gas is supplied to the anode 54 of the fuel cell stack 22, hydrogen ions are generated from hydrogen molecules by an electrode reaction caused by the catalyst. The hydrogen ions permeate through the solid polymer electrolyte membrane 52 and move to the cathode 56.

On the other hand, electrons released from the hydrogen molecules move from a negative electrode terminal 70 to loads such as the high-voltage battery 14, the motor 18, the air pump 40, and the ECU 30 via the current controller 16. The electrons move from the loads such as the high-voltage battery 14, the motor 18, the air pump 40, and the ECU 30 to the cathode 56 via the current controller 16 and a positive electrode terminal 72.

The loads in the fuel cell vehicle 10 include the motor 18 which is a main machine load, the air pump 40 which is an auxiliary machine load, and the like.

The power generation current If flows out from the positive electrode terminal 72 of the fuel cell stack 22. The power generation current If flows in a direction opposite to the flow of the electrons. The power generation current If is supplied to each load via the current controller 16. The power generation current If flows into the negative electrode terminal 70 from each load via the current controller 16. The power generation current If is detected by a current sensor 78.

In the cathode 56 of the fuel cell stack 22, hydrogen ions and electrons react with oxygen contained in the supplied oxygen-containing gas by the action of the catalyst, to thereby generate water.

A voltage sensor 76 and an impedance sensor 74 are provided in parallel between the positive electrode terminal 72 and the negative electrode terminal 70. The voltage sensor 76 detects the power generation voltage Vf of the fuel cell stack 22. The impedance sensor 74 detects the impedance Zs of the fuel cell stack 22.

The impedance Zs correlates with the system relative humidity (internal relative humidity) of the fuel cell stack 22. The system relative humidity depends on the degree of wetting (water content) of the solid polymer electrolyte membrane 52. As the degree of wetting increases, the impedance Zs decreases. The impedance Zs increases as the degree of wetting decreases (i.e., as the solid polymer electrolyte membrane transitions to a dry state).

A motor current Im flows between the current controller 16 and the motor 18. The motor current Im is a main machine current and is a power running current or a regenerative current.

An auxiliary machine current Ia flows between the current controller 16 and the auxiliary machine. Part of the auxiliary machine current Ia is input to and output from the high-voltage battery (HVBAT) 14. A current input to and output from the high-voltage battery (HVBAT) 14 is referred to as a high-voltage battery current Ih. The high-voltage battery 14 generates a high voltage Vh of about several hundred volts. The high-voltage battery current Ih is supplied to a high-voltage auxiliary machine such as the air pump 40.

The remaining part of the auxiliary machine current Ia is converted into low-voltage battery voltage Vl of about 10 to 50 [V] via a voltage converter 81. The voltage converter 81 is a step-down converter (SDC). The remaining part of the auxiliary machine current Ia is input to and output from a low-voltage battery 15. The current input to and output from the low-voltage battery 15 is referred to as a low-voltage battery current Il. The low-voltage battery 15 generates a low-voltage battery voltage Vl. The low-voltage battery current Il is supplied to a low-voltage auxiliary machine such as an ECU 30.

The auxiliary machine current Ia flows from the high-voltage battery 14 to the current controller 16. The auxiliary machine current Ia is supplied to the motor 18 as a part of the motor current Im.

In the fuel cell vehicle 10 configured as described above, electric power (generated electric power) of the fuel cell stack 22 and electric power (stored electric power) of the high-voltage battery 14 are supplied to the motor 18, the air pump 40, the ECU 30, and the like. The motor 18 is a main machine. The air pump 40, the ECU 30, and the like are auxiliary machines.

In the oxygen-containing gas system 24, the air pump 40 includes a mechanical supercharger driven by an internal motor. The air pump 40 inhales atmospheric air (air), and pressurizes the air. The air pump 40 supplies the pressurized air to the humidifier 42.

The humidifier 42 includes a flow path 84, a flow path 88, and a porous membrane. The oxygen-containing gas flows through the flow path 84. The oxygen-containing gas is dry air supplied from the air pump 40. Wet exhaust gas (oxygen-containing exhaust gas, cathode off-gas) flows through the flow path 88. The flow paths 84, 88 are formed in the porous membrane.

The humidifier 42 moves water (moisture) contained in the cathode off-gas to the supply gas (oxygen-containing gas) via the porous membrane. That is, the humidifier 42 moves water (moisture) contained in the cathode off-gas from the flow path 88 to the flow path 84 via the porous membrane.

The power generation performance of the fuel cell stack 22 (each power generation cell 50) changes according to the degree of humidification of the solid polymer electrolyte membrane 52. The degree of humidification of the supply gas is set to an appropriate humidification amount (relative humidity), in order to cause the fuel cell stack 22 to generate power suitably.

A bypass channel 92 is connected to a first end and a second end of the flow path 84 of the humidifier 42. The bypass channel 92 causes dry air from the air pump 40 to bypass the humidifier 42 and supplies the dry air to the fuel cell stack 22. The bypass channel 92 includes a bypass valve 90.

An intake port of the air pump 40 communicates with the atmosphere via a conduit 94, a shutoff valve 98 (optional), and a conduit 100.

A discharge port of the air pump 40 communicates with one end side of the flow path 84 of the humidifier 42 via a conduit 102. The second end of the flow path 84 communicates with the first end of a supply path 104. The second end of the supply path 104 communicates with the cathode flow field 60 in the fuel cell stack 22 via the oxygen-containing gas inlet passage 64a.

A conduit 110 is connected to a second end of the flow path 88 of the humidifier 42. The conduit 110 is provided with an outlet stop valve 112. A back pressure control valve 114 and a diluter 116 are disposed downstream of the outlet stop valve 112. A conduit 86 is connected to a first end of the flow path 88. The conduit 86 communicates with the oxygen-containing gas outlet passage 64b. The cathode off-gas is supplied from the cathode flow field 60 of the fuel cell stack 22 to the first end of the flow path 88.

The hydrogen tank 20 of the fuel gas system 26 includes an electromagnetic shutoff valve 118. The hydrogen tank 20 is a container that compresses highly pure hydrogen under high pressure, and stores the compressed hydrogen.

The fuel gas discharged from the hydrogen tank 20 passes through a conduit 120, the injector 44, a conduit 122, the ejector 46, and a conduit 124, and is supplied to the inlet of the anode flow field 58 of the fuel cell stack 22 via the fuel gas inlet passage 62a.

A fuel gas inlet pressure sensor 125 is provided in the conduit 124. The fuel gas inlet pressure sensor 125 detects the fuel gas inlet pressure Ph. The injector 44 controls the fuel gas inlet pressure Ph. The injector 44 is driven in the manner of PWM (pulse width modulation) by the ECU 30.

The coolant supply system 28 includes a cooling pump (WP) 150, a thermo valve 151, coolant circulation paths 152, 154, 155, a radiator 156, and a bypass channel 157. By the operation of the cooling pump 150, a coolant such as pure water, ethylene glycol, or oil flows through the thermo valve 151, the coolant circulation paths 152, 154, 155, the radiator 156, and the bypass channel 157. The coolant discharged from the cooling pump 150 is caused, by the thermo valve 151, to bifurcate into a coolant circulation path 152 and a bypass channel 157. The coolant flowing through the coolant circulation path 152 is supplied to the coolant inlet passage 66a of the fuel cell stack 22. The cooling pump 150 is controlled by the ECU 30 (control unit 204). The thermo valve 151 is a three way valve for temperature adjustment. The opening ratio of the thermo valve 151 is controlled by the ECU 30 (control unit 204). The opening ratio of the thermo valve 151 is a ratio between the opening degree of the bypass channel 157 (0 to 100 [%]) and the opening degree of the coolant circulation path 152 (100 to 0 [%]). When the opening ratio is 0:100, the coolant discharged from the cooling pump 150 flows through the coolant circulation path 152 and the coolant inlet passage 66a, and is entirely supplied into the fuel cell stack 22. When the opening ratio is 100:0, all the coolant discharged from the cooling pump 150 is sucked into the cooling pump 150 via the bypass channel 157, the coolant circulation path 155, and the radiator 156.

Basically, during the normal process (normal power generation), the coolant supplied to the coolant inlet passage 66a cools the power generation cells 50 in the fuel cell stack 22, and then is discharged from the coolant outlet passage 66b. The coolant discharged from the coolant outlet passage 66b flows into the radiators 156 via the coolant circulation paths 154 and 155. The coolant is cooled by the radiator 156. Further, the coolant is discharged from the cooling pump 150, and circulated and supplied to the fuel cell stack 22.

When the fuel cell vehicle 10 is started, the thermo valve 151 is switched such that all the coolant discharged from the cooling pump 150 flows through the bypass channel 157, as indicated by the dashed arrow. During normal power generation, the thermo valve 151 is switched such that all the coolant discharged from the cooling pump 150 flows through the coolant circulation path 152, as indicated by the solid arrow.

That is, at the time of start-up, the coolant circulates through the path formed by the cooling pump 150, the thermo valve 151, and the radiator 156, for the purpose of warm-up of the fuel cell stack 22.

A temperature sensor 158 is disposed near the coolant outlet passage 66*b* of the coolant circulation path 154. The temperature sensor 158 detects the temperature of the coolant (coolant temperature) Tw.

On the other hand, during the normal process (normal power generation), the internal temperature of the fuel cell stack 22 is controlled, in order to efficiently perform power generation (in order to promote the electrochemical reaction). That is, the internal temperature of the fuel cell stack 22 is controlled, for example, to be as high as possible (appropriate temperature) under the condition that the internal temperature is equal to or lower than the boiling point of water.

For this temperature control, the ECU 30 (control unit 204) circulates the coolant through the cooling pump 150, the thermo valve 151, the coolant circulation path 152, the fuel cell stack 22, the coolant circulation paths 154, 155, and the radiators 156 in this order. The ECU 30 (control unit 204) controls the rotation speed of the cooling pump 150.

A cooling fan 159 is provided near the radiator 156 so as to face the radiator 156. The cooling fan 159 cools the radiator 156 by blowing air. The higher the rotation speed of the cooling fan 159, the more the radiator 156 is cooled. The ECU 30 (control unit 204) controls the rotation speed of the cooling fan 159.

The outlet of the anode flow field 58 communicates with the inlet of the gas-liquid separator 48 via the fuel gas outlet passage 62*b* and a conduit 126. A fuel exhaust gas (anode off-gas), which is a hydrogen-containing gas, is supplied from the anode flow field 58 to the gas-liquid separator 48.

The gas-liquid separator 48 separates the anode off-gas into a gas component and a liquid component (liquid water). A part of the gas component of the anode off-gas is discharged from a gas discharge port 128 of the gas-liquid separator 48, and flows into the ejector 46 via a conduit 131. Another part of the gas component of the anode off-gas flows into the diluter 116 via a purge valve 132, a conduit 134 and a conduit 136.

Fuel gas is supplied to the ejector 46 from an injector 44 provided on the upstream of the ejector 46 via the conduit 122. Therefore, the gas component of the anode off-gas is mixed with the fuel gas in the ejector 46. The mixture gas is supplied to the anode flow field 58 of the fuel cell stack 22 via the conduit 124 and the fuel gas inlet passage 62*a*.

The liquid component of the anode off-gas flows from a liquid discharge port 138 of the gas-liquid separator 48 through a conduit 140, a drain valve 142, and a conduit 144. The conduit 144 is connected to the conduit 136. Therefore, the liquid component of the anode off-gas is merged with the anode off-gas and flows into the diluter 116 via the conduit 136. Further, the liquid component of the anode off-gas is discharged from the diluter 116 to the outside of the fuel cell vehicle 10.

The fuel cell vehicle 10 is provided with a power switch (power SW) 160. The power switch 160 is operated when the fuel cell vehicle 10 is to be started. When the fuel cell vehicle 10 is started, power generation by the fuel cell stack 22 is started. The power switch 160 is also operated when the fuel cell vehicle 10 is to be brought into a soak (key-off) state (a stoppage state). When the fuel cell vehicle 10 enters the soak state, power generation by the fuel cell stack 22 is stopped. The power switch 160 is an on-off switch.

Further, the fuel cell vehicle 10 is provided with an accelerator opening degree sensor 162. The accelerator opening degree sensor 162 detects an operation amount of an accelerator as an accelerator opening degree Ao.

Further, the fuel cell vehicle 10 is provided with a vehicle speed sensor 164. The vehicle speed sensor 164 detects a vehicle speed Vs.

The on/off state of the power switch 160, the accelerator opening degree Ao detected by the accelerator opening degree sensor 162, and the vehicle speed Vs detected by the vehicle speed sensor 164 are output to the ECU 30.

Although not shown, the fuel cell vehicle 10 is provided with one or more current sensors other than the above-described current sensor and one or more voltage sensors other than the above-described voltage sensor. For example, the first current sensor detects the motor current Im. The second current sensor detects the auxiliary machine current Ia. The third current sensor detects the high-voltage battery current Ih. The fourth current sensor detects the low-voltage battery current Il. The first voltage sensor detects a low-voltage battery voltage Vl.

Although not shown, the fuel cell system 12 is provided with one or more humidity sensors, one or more temperature sensors other than the above-described temperature sensor, and one or more pressure sensors. For example, the humidity sensor detects the relative humidity RH of the oxygen-containing gas supplied to the oxygen-containing gas inlet passage 64*a*. The temperature sensor detects an anode off-gas temperature To at the fuel gas outlet passage 62*b*. The pressure sensor detects an oxygen-containing gas pressure Pog at the of the oxygen-containing gas inlet passage 64*a*. The pressure sensor detects a tank pressure Pt at the outlet of the hydrogen tank 20.

Detection values of the various sensors are output to the ECU 30.

[1-1. Configuration of Navigation Device 210]

As shown in FIG. 2, the navigation device 210 includes the navigation control unit 212 and peripheral devices. The peripheral devices include an input unit 214, a positioning unit 216, a video output unit 218, an audio output unit 220, and a communication unit 222.

The input unit 214 includes various switches and a microphone. The various switches include, for example, a touch panel or the like provided in the video output unit 218. The occupant can operate the various switches. The microphone collects sound emitted by the occupant. The input unit 214 outputs the input information to the navigation control unit 212.

The positioning unit 216 includes various devices that measure the position of the vehicle 10 by satellite navigation and inertial navigation. For example, the positioning unit 216 includes a GPS device, a vibration gyroscope (vibration gyro), and a vehicle speed sensor 164. The positioning unit 216 outputs the position information of the vehicle 10 to the navigation control unit 212.

The video output unit 218 includes a video device such as a liquid crystal display. The video output unit 218 displays video based on information output from the navigation control unit 212. The audio output unit 220 includes an audio device such as a speaker. The audio output unit 220 outputs audio based on the information output from the navigation control unit 212.

The communication unit 222 includes a communication terminal. The communication terminal is a communication device using Near Field Communication technology such as Bluetooth (registered trademark). The communication unit 222 outputs information to the navigation control unit 212. The communication unit 222 receives information output from the navigation control unit 212. The mobile terminal 224 is communicably connected to the communication unit 222. The mobile terminal 224 is connected to another mobile terminal 224 outside the fuel cell vehicle 10, a server, etc. via a base station so as to be capable of wireless communication.

The navigation control unit 212 includes a processor (CPU) 230 and a memory (storage device) 232. The processor 230 functions as various functional units by executing programs stored in the memory 232. Here, the processor 230 functions as a route search unit 234 and a route learning unit 236.

The route search unit 234 recognizes the current position of the vehicle 10 based on the position information output by the positioning unit 216. The route search unit 234 recognizes the destination of the vehicle 10 based on actual destination information 240 or predicted destination information 242 stored in the memory 232. Further, the route search unit 234 searches for a route from the current position to the destination (actual destination or predicted destination) of the vehicle 10, by using map information 246 stored in the memory 232. The route search unit 234 records the searched route (planned travel route) in the memory 232 as route information 244.

The occupant can set the destination using the input unit 214. When the destination is set by the occupant, the route search unit 234 records the position information of the destination in the memory 232 as the actual destination information 240.

There may be a case in which an occupant causes the vehicle 10 to travel without setting a destination. In such a case, the route search unit 234 can predict the destination. For example, the route search unit 234 compares the travel state (departure place, actual traveling route, current position, traveling direction, and the like) up to the current time in point with each travel history of history information 248 stored in the memory 232. When there is a travel history that overlaps with the travel state up to that point in time, the route search unit 234 can predict an arrival place in the travel history as a destination. In a case where there are a plurality of travel histories that partially overlap with the travel state up to that point in time but have different arrival places, the route search unit 234 may set, as the destination, the arrival place that has been to most. Note that the route search unit 234 may start the prediction of the destination at a time when the vehicle a certain distance away from the departure place. When the mobile terminal 224 communicates with the outside, the route search unit 234 acquires information (telephone number, mail address, etc.) of a communication destination from the mobile terminal 224. The route search unit 234 compares the acquired information with POI (Point Of Interest) information included in the map information 246 to thereby obtain the location of the communication destination. When the destination is predicted, the route search unit 234 records position information of the destination in the memory 232 as the predicted destination information 242.

The route learning unit 236 learns a route from a departure place where the vehicle 10 actually departed to an arrival place where the vehicle 10 actually arrived. For example, the departure place and the arrival place are a home, a company, a supermarket, or the like. Each time the vehicle 10 travels, the route learning unit 236 acquires position information of a departure place, position information of an arrival place, and information indicating an actually traveled route (for example, information of nodes and links) from the map information 246. The route learning unit 236 records the acquired information in the memory 232 in association with each other. This recorded information is referred to as the history information 248.

The processor 230 also functions as a normal navigation execution unit. For example, the processor 230 causes the liquid crystal display of the video output unit 218 to display a surrounding map of the vehicle 10. The processor 230 causes the own vehicle icon to be displayed at a position corresponding to the current position of the vehicle 10 on the liquid crystal display. The processor 230 executes route guidance for guiding the occupant to the destination.

In addition to the various programs, the memory 232 stores therein the actual destination information 240, the predicted destination information 242, the route information 244, the map information 246, and the history information 248 as described above. The map information 246 is recorded in the memory 232 in advance. The map information 246 includes, in addition to a map, location information of a POI such as a company or a supermarket, and POI information indicating a telephone number or the like. Further, the map information 246 includes information such as the position (start position, end position) and gradient of an uphill road. Each of the actual destination information 240, the predicted destination information 242, and the route information 244 is deleted when the vehicle 10 arrives at the destination or when the occupant performs a process of deleting the destination.

The navigation control unit 212 is communicably connected to the ECU 30. The ECU 30 controls the fuel cell vehicle 10.

[1-2. ECU 30]

The determination unit 202 determines whether the vehicle 10 travels on an uphill road or not based on information acquired from the navigation control unit 212. For example, the determination unit 202 recognizes the route on which the vehicle 10 will travel from now, using the position information of the vehicle 10 measured by the positioning unit 216 and the route information 244 stored in the memory 232. Furthermore, the determination unit 202 determines whether an uphill road is present on the route or not using the map information 246 stored in the memory 232. When an uphill road is present in the recognized route, the determination unit 202 determines that the vehicle 10 will travel on the uphill road in the future.

When the determination unit 202 determines that the vehicle 10 travels on an uphill road, the control unit 204 executes at least one of the temperature reduction control and the humidification control. The control unit 204 executes at least one of the temperature reduction control and the humidification control in advance before the vehicle 10 reaches the uphill road. The temperature reduction control is control for reducing the temperature of the fuel cell stack 22 so as to be lower than the temperature before the start of the control. Further, the temperature reduction control is control for increasing the degree of cooling of the fuel cell stack 22 by the coolant supply system 28. The humidification control is control for increasing the water content of the fuel cell stack 22 so as to be more than the water content before the start of the control. The humidification control is control for increasing the degree of humidification of the fuel cell stack 22 by the oxygen-containing gas system 24.

For example, the control unit 204 performs, as the temperature reduction control, control for increasing the flow rate of the coolant which is caused to flow through the fuel cell stack 22 by the thermo valve 151, so as to be higher than before the start of the control. In addition, for example, the control unit 204 performs control for increasing the rotation speed of the cooling pump 150 higher than before the start of the control, as the temperature reduction control. In addition, for example, the control unit 204 performs control for increasing the rotation speed of the cooling fan 159 higher than before the start of the control, as the temperature reduction control.

For example, the control unit 204 performs control for closing the bypass valve 90, as the humidification control. In addition, for example, as the humidification control, the control unit 204 performs control for reducing the amount of the oxygen-containing gas supplied by the air pump 40 to an amount less than before the start of the control.

When the determination unit 202 determines that the vehicle 10 will travel on an uphill road, the notification unit 206 outputs instruction information for notifying the occupant of execution of the temperature reduction control or the humidification control, to the video output unit 218 and the audio output unit 220. The video output unit 218 and the audio output unit 220 notify the occupant that the temperature reduction control or the humidification control will be executed, based on the instruction information.

In addition to various programs, the memory 32 stores in advance various thresholds, predetermined values, conditions, and the like used by the processor 31.

2. Processing Executed by Navigation Device 210

[2-1. Route Setting Process]

After turning on the power switch 160 of the vehicle 10, the occupant operates the input unit 214 of the navigation device 210 to set a destination. In this case, the memory 232 records the position information of the set destination as the actual destination information 240.

On the other hand, when the occupant does not set any destination, the route search unit 234 predicts the destination. When the route search unit 234 has predicted the destination, the memory 232 records the position information of the predicted destination as the predicted destination information 242. The route search unit 234 periodically predicts a destination. Alternatively, the route search unit 234 predicts the destination at a predetermined timing. When the predicted destination is different from the destination recorded as the predicted destination information 242, the route search unit 234 records the position information of the most-recently predicted destination in the memory 232 as the predicted destination information 242.

When the actual destination information 240 or the predicted destination information 242 is recorded in the memory 232, the route search unit 234 searches for a route from the current location to the destination. When both the actual destination information 240 and the predicted destination information 242 are recorded, the route search unit 234 selects the actual destination information 240. When the current position deviates from the route or when the destination is changed, the route search unit 234 performs route search again. The memory 232 stores therein the route searched by the route search unit 234 as the route information 244.

[2-2. Route Learning Process]

The route learning unit 236 sequentially records the position information of the departure place of the vehicle 10 in the memory 232. The position of the departure place of the vehicle 10 is, for example, a position at which an occupant turns on the power switch 160. The route learning unit 236 sequentially records, in the memory 232, the position information of the destination set by the occupant. The route learning unit 236 sequentially records the links and nodes of the actually traveled route in the memory 232. The route learning unit 236 sequentially records the position information of the arrival place of the vehicle 10 in the memory 232. The position of the arrival place of the vehicle 10 is, for example, a position at which the occupant turns off the power switch 160. The route learning unit 236 associates each piece of information with each other at a predetermined timing and records the associated information in the memory 232 as the history information 248. Examples of the predetermined timing include a timing at which the power switch 160 is turned off and a timing at which the door of the vehicle 10 is opened.

3. Processing Performed by ECU 30

[3-1. Main Process]

Figure 3:
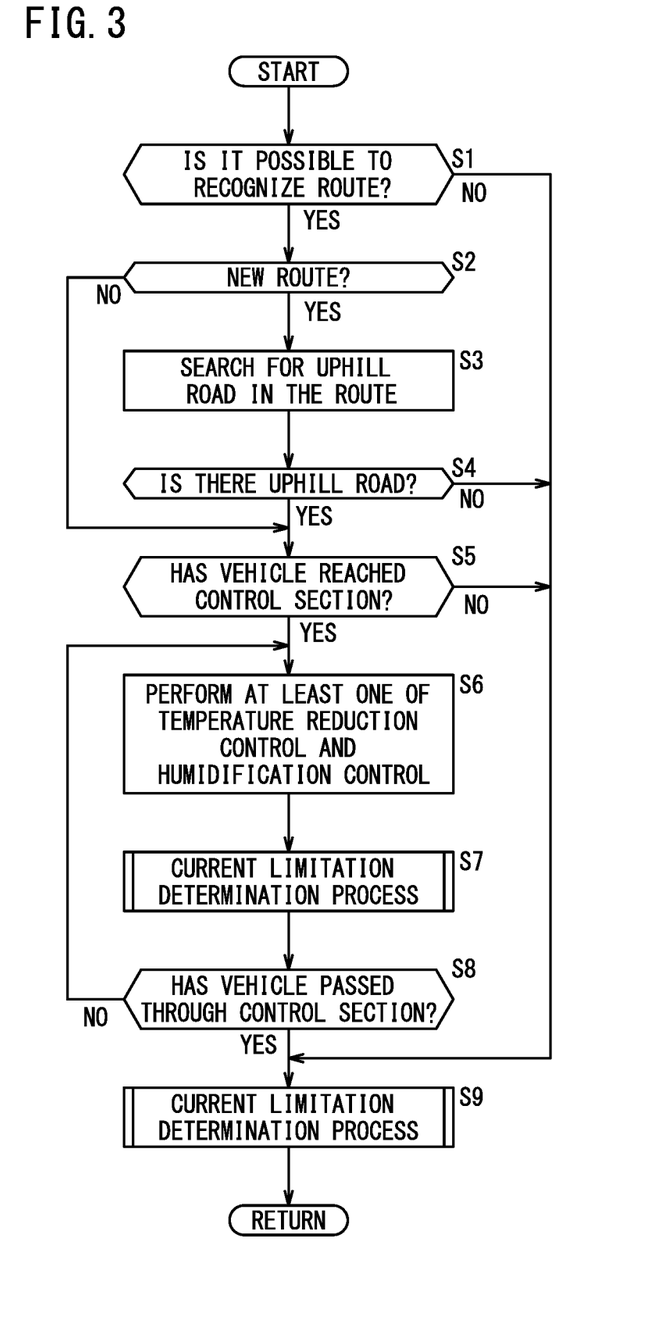
FIG. 3 is a flowchart of main processing executed by the ECU.

FIG. 3 is a flowchart of the main process executed by the ECU 30. The ECU 30 repeatedly executes the processing shown in FIG. 3 during a period from when the power switch 160 of the vehicle 10 is turned on to when it is turned off.

In step S1, the determination unit 202 determines whether the route of the vehicle 10 after the current time point can be recognized or not. When the route information 244 is stored in the memory 232 of the navigation control unit 212, the determination unit 202 can recognize the route of the vehicle 10 after the current time point. In this case (step S1: YES), the process proceeds to step S2. On the other hand, when the route information 244 is not stored in the memory 232 of the navigation control unit 212, the determination unit 202 cannot recognize the route of the vehicle 10 after the current time point. In this case (step S1: NO), the process proceeds to step S9.

In step S2, the determination unit 202 determines whether the recognized route is a newly set route or not. There may be a case in which the occupant sets or changes the destination after the vehicle 10 starts traveling. There also may be a case in which the route search unit 234 of the navigation device 210 changes the predicted destination. In such cases, the route search unit 234 records new route information 244 in the memory 232. For example, the determination unit 202 can determine whether the route recognized in step S1 is a newly set route or not by comparing the route recognized so far with the route recognized this time. If the recognized route is a new route (step S2: YES), the process proceeds to step S3. On the other hand, when the recognized route is the same as the route recognized so far (step S2: NO), the process proceeds to step S5.

In step S3, the determination unit 202 searches for an uphill road in the route using the map information 246. For example, the determination unit 202 searches all the routes from the position of the vehicle 10 to the destination, for an uphill road. Alternatively, the determination unit 202 may set a predetermined range based on the position of the vehicle 10 and search the predetermined range for an uphill road. As the predetermined range, for example, a range from the current position to a position separated by a certain distance in the traveling direction is set. In addition, the determination unit 202 may ignore some uphill roads based on the determination criteria of uphill roads stored in the memory 232. Examples of the determination criteria of the uphill road include a threshold value for the gradient and a threshold value for the length of the uphill road. The determination unit 202 may adopt an uphill road satisfying the determination criteria and ignore an uphill road not satisfying the determination criteria. The uphill road satisfying the determination criteria is, for example, an uphill road having a gradient exceeding the threshold value. The uphill road that does not satisfy the determination criteria is, for example, an uphill road whose gradient does not exceed the threshold value.

When an uphill road is found, the determination unit 202 sets a section in which at least one of the temperature reduction control and the humidification control is performed on the uphill road. A section in which at least one of the temperature reduction control and the humidification control is performed is referred to as a control section. For example, the determination unit 202 sets, as the start of the control section, a position that is a first predetermined distance away from the start position of the uphill road toward the vehicle 10. The determination unit 202 sets, as the end of the control section, a position that is a second predetermined distance away from the end position of the uphill road toward the vehicle 10 or the end position itself. When a plurality of uphill roads are found, the determination unit 202 sets a control section for each uphill road. Each of the first predetermined distance and the second predetermined distance is calculated according to the performance of the fuel cell system 12 and recorded in advance in the memory 32. Alternatively, the first predetermined distance and the second predetermined distance may be set according to at least one of the gradient and the length of the uphill road. In this case, the start of the control section is set at a position further away from the start position of the uphill road toward the vehicle 10 as the gradient of the uphill road increases. Alternatively, the start of the control section is set at a position further away from the start position of the uphill road toward the vehicle 10 as the length of the uphill road increases. After completion of step S3, the process proceeds to step S4.

In step S4, the determination unit 202 determines whether there is an uphill road in the route or not. If an uphill road is found as a result of the search in step S3 (step S4: YES), the process proceeds to step S5. On the other hand, when an uphill road is not found (step S4: NO), the process proceeds to step S9.

In step S5, the determination unit 202 determines whether the vehicle 10 has reached the control section set in step S3 or not. When the vehicle 10 has reached the control section (step S5: YES), the process proceeds to step S6. When the vehicle 10 is traveling in the control section, the process proceeds to step S6. On the other hand, when the vehicle 10 has not reached the control section (step S5: NO), the process proceeds to step S9.

In step S6, the control unit 204 performs at least one of the temperature reduction control and the humidification control. Here, the control unit 204 may perform predetermined control (one or both of the temperature reduction control and the humidification control). The control unit 204 may determine which control to be actually performed according to the situation at that time. For example, the control unit 204 may perform the temperature reduction control when the temperature of the fuel cell stack 22 is higher than a temperature reduction threshold. In this case, the control unit 204 determines the temperature of the fuel cell stack 22 based on the coolant temperature Tw or the anode off-gas temperature To. The control unit 204 may perform the humidification control when the humidity of the fuel cell stack 22 is lower than a humidity threshold. In this case, the control unit 204 determines the humidity of the fuel cell stack 22 based on the impedance Zs.

The control unit 204 may control the opening ratio of the thermo valve 151 when performing the temperature reduction control. In this case, the control unit 204 increases the opening degree of the thermo valve 151 of the coolant circulation path 152 so as to be larger than that before the start of the temperature reduction control. In addition, the control unit 204 decreases the opening degree of the thermo valve 151 of the bypass channel 157 so as to be smaller than that before the start of the temperature reduction control. Then, the flow rate of the coolant supplied from the thermo valve 151 to the fuel cell stack 22 becomes higher than before the start of the temperature reduction control. Therefore, the cooling efficiency of the fuel cell stack 22 increases. As a result, the temperature of the fuel cell stack 22 decreases.

The control unit 204 may control the rotation speed of the cooling pump 150 when performing the temperature reduction control. In this case, the control unit 204 increases the rotation speed of the cooling pump 150 by making the duty ratio in the PWM control of the cooling pump 150 larger than that before the start of the temperature reduction control. Then, the flow rate of the coolant discharged from the cooling pump 150 increases higher than before the start of the temperature reduction control. Therefore, the cooling efficiency of the fuel cell stack 22 increases. As a result, the temperature of the fuel cell stack 22 decreases.

The control unit 204 may control the rotation speed of the cooling fan 159 when performing the temperature reduction control. The control unit 204 increases the rotation speed of the cooling fan 159 by making the duty ratio in the PWM control of the cooling fan 159 larger than that before the start of the temperature reduction control. Then, the temperature of the coolant passing through the radiator 156 becomes lower than that before the start of the temperature reduction control. Therefore, the cooling efficiency of the fuel cell stack 22 increases. As a result, the temperature of the fuel cell stack 22 decreases.

When performing the humidification control, the control unit 204 may perform control to close the bypass valve 90. In this case, the control unit 204 outputs a close signal to the bypass valve 90 to close the bypass valve 90. Then, all the oxygen-containing gas discharged from the air pump 40 is supplied to the fuel cell stack 22 via the humidifier 42. Therefore, the humidity of the fuel cell stack 22 increases. As a result, the water content of the fuel cell stack 22 increases.

The control unit 204 may control the rotation speed of the air pump 40 when performing the humidification control. In this case, the control unit 204 decreases the rotation speed of the air pump 40 by making the duty ratio in the PWM control of the air pump 40 smaller than that before the start of the humidification control. Then, the flow rate of the oxygen-containing gas discharged from the air pump 40 becomes smaller than that before the start of the humidification control. Then, the air stoichiometry of the fuel cell stack 22 decreases. Therefore, the amount of water carried away by the oxygen-containing gas decreases, and the humidity inside the fuel cell stack 22 increases. As a result, the water content of the fuel cell stack 22 increases.

Note that the control unit 204 may perform various controls using a control map. In this case, the control unit 204 may perform the above-described temperature reduction control and humidification control by switching from a control map used on a flat road to a control map used on an uphill road.

The control unit 204 performs at least one of the temperature reduction control and the humidification control while the vehicle 10 is traveling in the control section. The process proceeds to step S7.

In step S7, the control unit 204 performs a current limitation determination process. The current limitation determination process is a process for determining whether current limitation should be performed or not (i.e., whether to limit the current). Normally, the power generation current If of the fuel cell stack 22 is not limited. In this case, the fuel cell stack 22 can increase the power generation current If to the rated value Ir. That is, normally, the rated value Ir is a current limit value Iu. On the other hand, at the time of current limitation, the power generation current If of the fuel cell stack 22 is limited to a current limit value Iu that is less than the rated value Ir. The current limitation determination process will be described in [3.2] below.

In step S8, the determination unit 202 determines whether the vehicle 10 has passed through the control section set in step S3 or not. When the vehicle 10 has passed through the control section (step S8: YES), the process proceeds to step S9. On the other hand, when the vehicle 10 has not yet passed through the control section, that is, when the vehicle 10 is still traveling in the control section (step S8: NO), the process returns to step S6.

In step S9, the control unit 204 performs a current limitation determination process.

[3-2. Current Limitation Determination Process]

Figure 4:
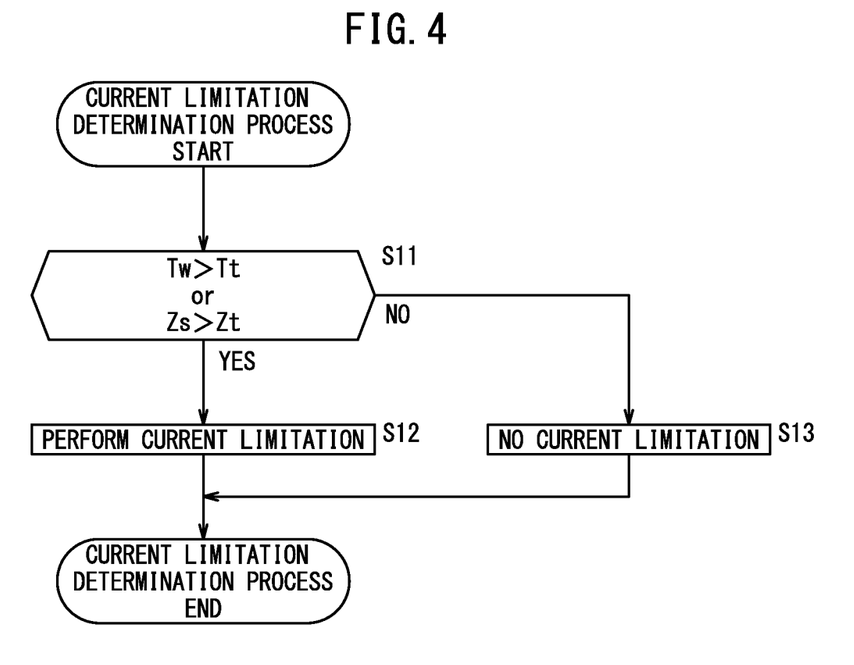
FIG. 4 is a flowchart of a current limitation determination process executed by the ECU.

FIG. 4 is a flowchart of the current limitation determination process executed by the ECU 30. In step S7 and step S9 shown in FIG. 3, the control unit 204 of ECU 30 performs processing described below. The control unit 204 monitors the temperature of the fuel cell stack 22, for example, the coolant temperature Tw. In addition, the control unit 204 monitors the impedance Zs. The impedance Zs correlates with the system relative humidity of the fuel cell stack 22.

In step S11, the control unit 204 compares the coolant temperature Tw with a temperature threshold value Tt. In addition, the control unit 204 compares the impedance Zs with an impedance threshold Zt. If Tw>Tt or Zs>Zt (step S11: YES), then the process proceeds to step S12. On the other hand, if Tw≤Tt and Zs≤Zt (step S11: NO), then the process proceeds to step S13.

In step S12, the control unit 204 performs current limitation. The control unit 204 reduces the current limit value Iu to less than the rated value Ir. Thereafter, the control unit 204 controls the power generation current If of the fuel cell stack 22 with the current limit value Iu as an upper limit value.

In step S13, the control unit 204 does not perform current limitation. The control unit 204 controls the power generation current If of the fuel cell stack 22 with the rated value Ir as an upper limit value.

Figure 5:
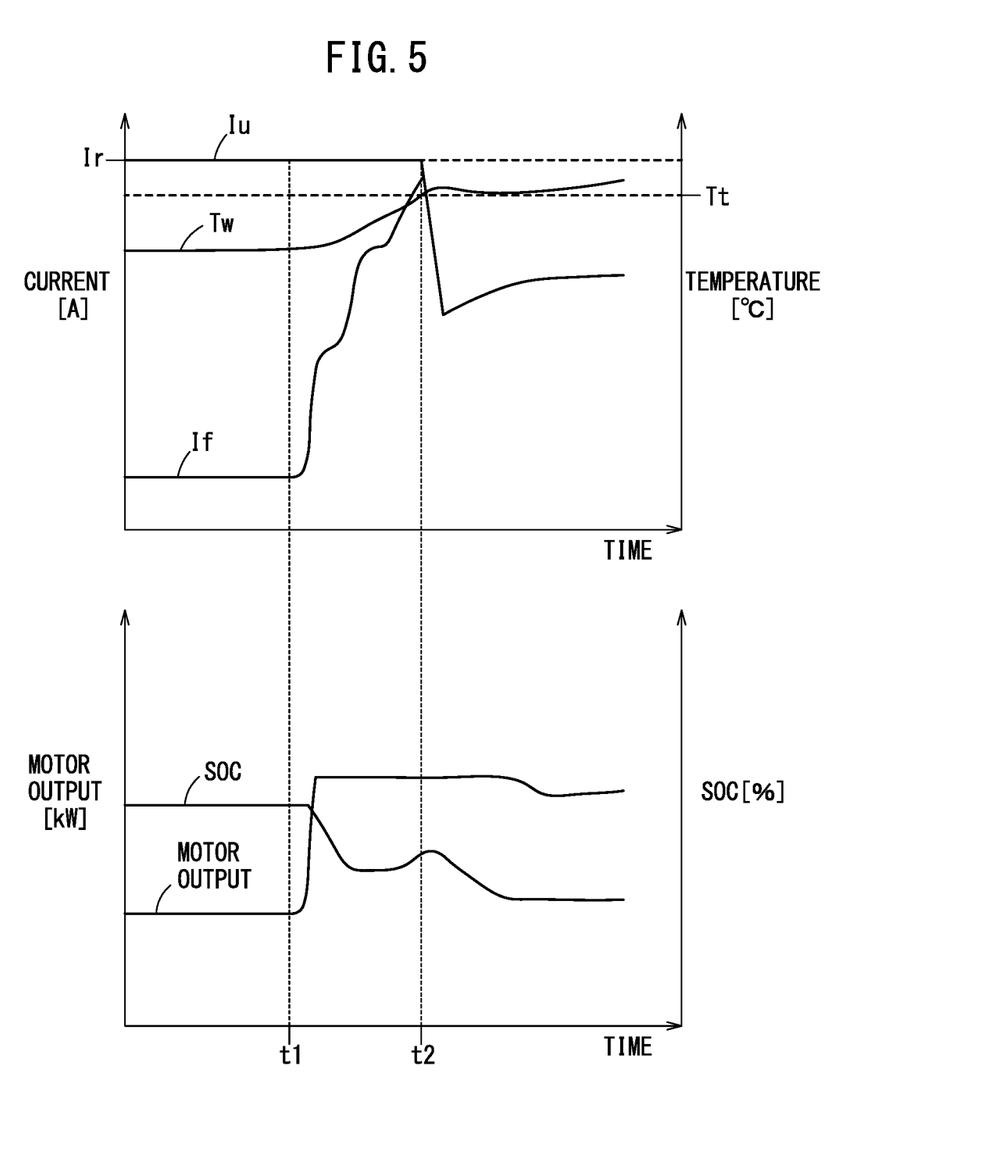
FIG. 5 is a diagram showing changes in the temperature and the like of the fuel cell stack in a case where temperature reduction control is not performed.
Figure 6:
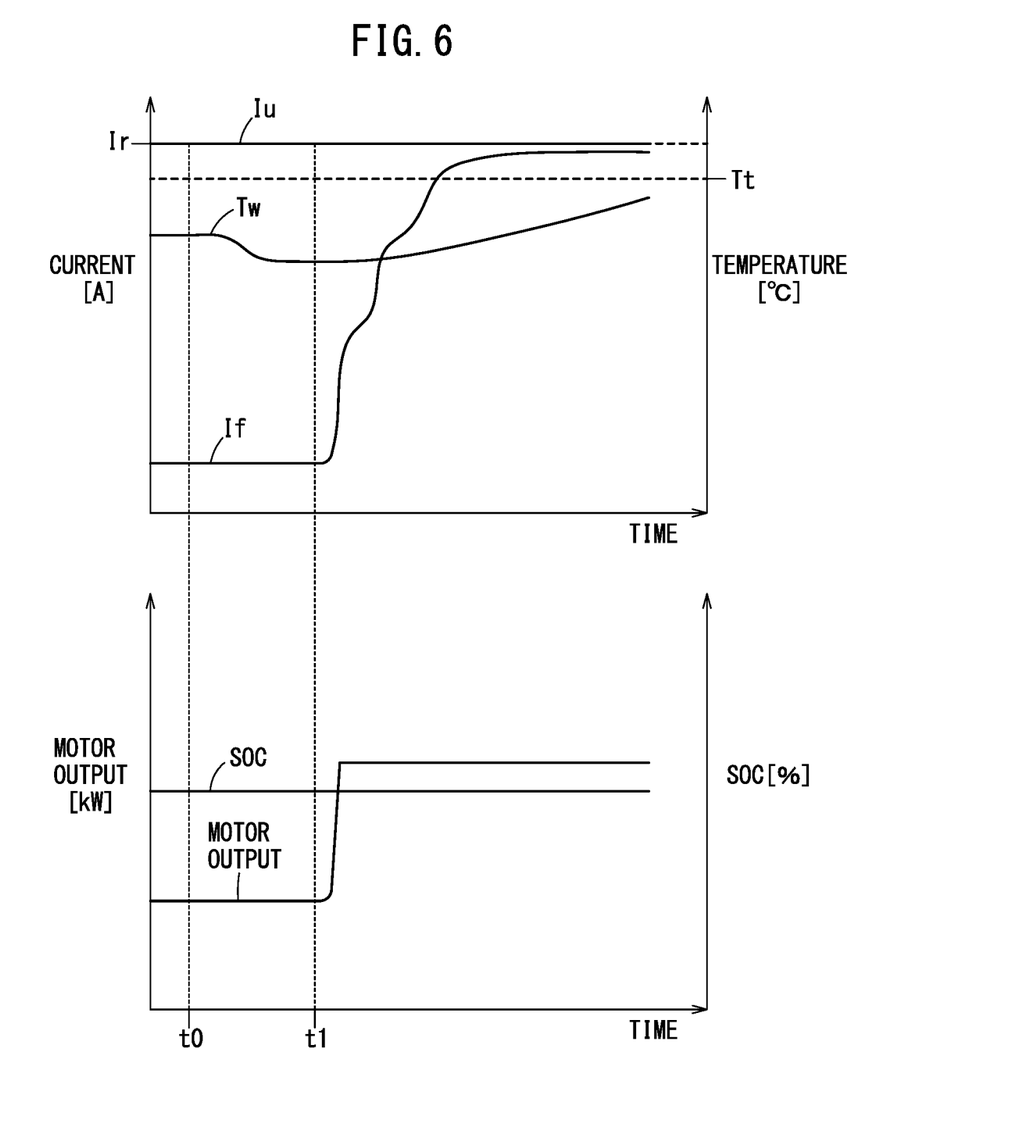
FIG. 6 is a diagram showing changes in the temperature and the like of the fuel cell stack when the temperature reduction control is performed.

4. Comparison Between Case where Temperature Reduction Control is Performed and Case where Temperature Reduction Control is not Performed FIG. 5 is a diagram showing changes in the temperature and the like of the fuel cell stack 22 when the temperature reduction control is not performed. FIG. 6 is a diagram showing changes in the temperature and the like of the fuel cell stack 22 when the temperature reduction control is performed.

First, a change in the temperature of the fuel cell stack 22 and a change in the power generation current If of the fuel cell stack 22 in the case where neither the temperature reduction control nor the humidification control are performed will be described with reference to FIG. 5. When the vehicle 10 enters an uphill road at time t1, the temperature of the fuel cell stack 22, for example, the coolant temperature Tw gradually increases. When the coolant temperature Tw exceeds the temperature threshold Tt at the time t2, the current limitation is started. At this time, the current limit value Iu, which is the upper limit value, is set to a value lower than the rated value Ir. The shortage of electric power due to the limitation of the power generation current If is covered by the output of the high-voltage battery 14. When the capacity of the high-voltage battery 14 is small, the SOC of the high-voltage battery 14 decreases relatively quickly. When the SOC is lower than the lower limit value of the allowable value, the vehicle speed Vs is limited.

Next, a change in the temperature of the fuel cell stack 22 and a change in the power generation current If of the fuel cell stack 22 in the case where the temperature reduction control is performed will be described with reference to FIG. 6. When the vehicle 10 reaches the control section at time t0, the control unit 204 starts the temperature reduction control. Then, the temperature of the fuel cell stack 22, for example, the coolant temperature Tw, gradually decreases. When the vehicle 10 enters an uphill road at time t1, the coolant temperature Tw gradually increases. However, since the coolant temperature Tw is set to be low in advance, it takes time until the coolant temperature Tw exceeds the temperature threshold Tt. As long as the coolant temperature Tw does not exceed the temperature threshold value Tt, the control unit 204 does not perform current limitation (step S13 in FIG. 4). In addition, since the control unit 204 does not use the high-voltage battery 14 for driving the motor 18, the SOC of the high-voltage battery 14 does not decrease. Therefore, the vehicle speed Vs is not limited.

5. Modification

In the above-described embodiment, in step S5 of the main process (FIG. 3), the determination unit 202 obtains the distance that the vehicle 10 will travel before reaching the uphill road. The determination unit 202 determines whether the obtained distance is equal to or less than the first predetermined distance or not. When the obtained distance is equal to or less than the first predetermined distance, the control unit 204 performs at least one of the temperature reduction control and the humidification control. Instead of this, the determination unit 202 may obtain a traveling time required for the vehicle 10 to reach the uphill road. Furthermore, the determination unit 202 may determine whether the obtained time is equal to or less than a predetermined time or not. The control unit 204 may perform at least one of the temperature reduction control and the humidification control if the obtained time is equal to or less than the predetermined time. The predetermined time is calculated according to the performance of the fuel cell system 12 and is recorded in advance in the memory 32.

6. Invention Obtained from Embodiment

The invention that can be grasped from the above embodiment will be described below.

According to a first aspect of the present invention, there is provided a method of operating a fuel cell vehicle 10 including a fuel cell system 12 including a fuel cell stack 22, the fuel cell stack including a plurality of power generation cells 50 stacked together, the power generation cells generating electric power by an electrochemical reaction of a fuel gas and an oxygen-containing gas, the fuel cell vehicle being configured to travel by electric power generated by the fuel cell system 12, the method including: a determination step (steps S1 to S4) of determining whether the fuel cell vehicle 10 travels on an uphill road or not; and a control step (step S6) of, if it is determined in the determination step that the fuel cell vehicle 10 travels on the uphill road, performing at least one of a temperature reduction control and a humidification control by the time the fuel cell vehicle 10 reaches the uphill road, wherein the temperature reduction control is a control of reducing a temperature (coolant temperature Tw) of the fuel cell stack 22 so as to be less than the temperature before start of the control and the humidification control is a control of increasing a water content of the fuel cell stack 22 so as to be greater than the water content before start of the control.

According to the above-described configuration, before the vehicle 10 reaches the uphill road, the temperature of the fuel cell stack 22 is decreased to be lower than that during traveling on a flat road. Therefore, when the vehicle 10 travels on an uphill road, there is a margin between the temperature of the fuel cell stack 22 and the upper limit value. Alternatively, according to the above-described configuration, before the vehicle 10 reaches an uphill road, the fuel cell stack 22 is humidified further than when the vehicle 10 travels on a flat road. Therefore, when the vehicle 10 travels on an uphill road, there is a margin between the humidity of the fuel cell stack 22 and the lower limit value. The humidity of the fuel cell stack 22 is determined based on the impedance Zs. Therefore, while the vehicle 10 is traveling on an uphill road, there is a margin between the temperature of the fuel cell stack 22 and the upper limit value, and there is a margin between the humidity of the fuel cell stack 22 and the lower limit value. As a result, current limitation of the fuel cell stack 22 is less likely to occur, and accordingly, vehicle speed limitation is less likely to occur. Thus, according to the above-described configuration, it is possible to prevent the vehicle speed Vs from being limited during traveling on an uphill road while protecting the fuel cell stack 22.

In the first aspect, in the determination step, a route on which the fuel cell vehicle 10 will travel from now (from the current time) may be recognized (step S1), and it may be determined that the fuel cell vehicle 10 travels on the uphill road if the uphill road is present in the route (step S4: YES).

In the first aspect, when a destination is set in the navigation device 210, in the determination step, a planned travel route to the destination created by the navigation device 210 may be recognized as the route.

In the first aspect, when a destination is not set in the navigation device 210, in the determination step, a planned travel route predicted by the navigation device 210 based on a travel history may be recognized as the route.

In the first aspect, when a destination is not set in the navigation device 210 and communication to the outside of the vehicle is performed by the occupant, in the determination step, a location of a communication destination of the communication, recorded in the map information 246, may be set as the destination, and a planned travel route to the destination created by the navigation device 210 may be recognized as the route.

In the first aspect, in the control step, when a travel distance that the fuel cell vehicle 10 will travel to reach the uphill road is equal to or less than a predetermined distance or when a travel time required for the fuel cell vehicle 10 to reach the uphill road is equal to or less than a predetermined time, at least one of the temperature reduction control and the humidification control may be performed.

According to the above configuration, the vehicle 10 can start at least one of the temperature reduction control and the humidification control at an appropriate timing.

In the first aspect, the fuel cell stack 22 may be cooled by a coolant, the fuel cell system 12 may include a radiator 156 that cools the coolant, a circulation path (coolant circulation paths 152, 154, 155) and a cooling pump 150 that circulate the coolant between the fuel cell stack 22 and the radiator 156, and an adjusting valve (thermo valve 151) that adjusts the flow rate of the coolant flowing from the radiator 156 to the fuel cell stack 22, and in the control step, the temperature reduction control for increasing the flow rate of the coolant that is caused to flow through the fuel cell stack 22 by the adjusting valve, so as to be higher than the flow rate before the start of control may be performed.

In the first aspect, the fuel cell stack 22 may be cooled by a coolant, the fuel cell system 12 may include a radiator 156 that cools the coolant, a circulation path (coolant circulation paths 152, 154, 155) and a cooling pump 150 that circulate the coolant between the fuel cell stack 22 and the radiator 156, and in the control step, the temperature reduction control may be performed in which the rotation speed of the cooling pump 150 is increased so as to be higher than the rotation speed before the start of the control.

In the first aspect, the fuel cell stack 22 may be cooled by a coolant, the fuel cell system 12 may include a radiator 156 that cools the coolant, a cooling fan 159 that blows air to the radiator 156, a circulation path (coolant circulation paths 152, 154, 155) and a cooling pump 150 that circulate the coolant between the fuel cell stack 22 and the radiator 156, and in the control step, the temperature reduction control may be performed to increase the rotation speed of the cooling fan 159 higher than the rotation speed before the start of the control.

In the first aspect, the fuel cell system 12 may include a humidifier 42 that humidifies one reactant gas of the oxygen-containing gas and the fuel gas to be supplied to the fuel cell stack 22, a bypass channel 92 that guides the one reactant gas to the fuel cell stack 22 while bypassing the humidifier 42, and a bypass valve 90 provided in the bypass channel 92, and in the control step, the humidification control for closing the bypass valve 90 may be performed.

In the first aspect, the fuel cell system 12 may include a humidifier 42 that humidifies the oxygen-containing gas to be supplied to the fuel cell stack 22, and an air pump 40 that supplies the oxygen-containing gas to the humidifier 42. In the control step, the humidification control may be performed in which the supply amount of the oxygen-containing gas supplied by the air pump 40 is decreased so as to be smaller than the supply amount before the start of the control.

In the first aspect, in the control step, at least one of the temperature reduction control and the humidification control may be executed even while the fuel cell vehicle 10 is traveling on the uphill road.

According to a second aspect of the present invention, there is provided a fuel cell vehicle 10 equipped with a fuel cell system 12 including a fuel cell stack 22, the fuel cell stack including a plurality of power generation cells 50 stacked together, the power generation cells generating electric power by an electrochemical reaction of a fuel gas and an oxygen-containing gas, the fuel cell vehicle being configured to travel by electric power generated by the fuel cell system 12. The fuel cell vehicle includes: a determination unit 202 configured to determine whether the fuel cell vehicle travels on an uphill road or not; and a control unit 204 configured to, if the determination unit 202 determines that the fuel cell vehicle travels on the uphill road, perform at least one of a temperature reduction control and a humidification control by the time the fuel cell vehicle reaches the uphill road, wherein the temperature reduction control is a control of reducing a temperature of the fuel cell stack 22 so as to be less than the temperature before start of the control and the humidification control is a control of increasing a water content of the fuel cell stack 22 so as to be greater than the water content before start of the control.

The second aspect has the same effect as the first aspect.

It should be noted that the fuel cell vehicle and the method of operating the same according to the present invention are not limited to the above-described embodiment, and may adopt various configurations without departing from the scope of the present invention.

What is claimed is:

1. A method of operating a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system, the method comprising:
    determining whether the fuel cell vehicle travels on an uphill road or not based on map information stored in a memory; and
    if it is determined in the determining that the fuel cell vehicle travels on the uphill road, performing at least one of a temperature reduction control and a humidification control by a time the fuel cell vehicle reaches the uphill road, wherein the temperature reduction control is a control of reducing a temperature of the fuel cell stack so as to be less than the temperature before start of the temperature reduction control and the humidification control is a control of increasing a water content of the fuel cell stack so as to be greater than the water content before start of the humidification control.

2. The method of operating the fuel cell vehicle according to claim 1, wherein
    in the determining, a route on which the fuel cell vehicle will travel from a current time is recognized, and it is determined that the fuel cell vehicle will travel on the uphill road if the uphill road is present in the route.

3. The method of operating the fuel cell vehicle according to claim 2, wherein,
    when a destination is set in a navigation device,
    in the determining, a planned travel route to the destination created by the navigation device is recognized as the route.

4. The method of operating the fuel cell vehicle according to claim 2, wherein,
    when a destination is not set in a navigation device,
    in the determining, a planned travel route predicted by the navigation device based on a travel history is recognized as the route.

5. The method of operating the fuel cell vehicle according to claim 2, wherein,
    when a destination is not set in a navigation device and communication to outside of the vehicle is performed by an occupant,
    in the determining, a location of a communication destination of the communication, recorded in map information, is set as the destination, and a planned travel route to the destination created by the navigation device is recognized as the route.

6. The method of operating the fuel cell vehicle according to claim 1, wherein,
    in the performing, when a distance that the fuel cell vehicle will travel to reach the uphill road is equal to or less than a predetermined distance or when a time required for the fuel cell vehicle to reach the uphill road is equal to or less than a predetermined time, at least one of the temperature reduction control and the humidification control is performed.

7. The method of operating the fuel cell vehicle according to claim 1, wherein,
    the fuel cell stack is cooled by a coolant, and
    the fuel cell system includes:
    a radiator configured to cool the coolant;
    a circulation path and a cooling pump that are configured to circulate the coolant between the fuel cell stack and the radiator; and
    an adjusting valve configured to adjust a flow rate of the coolant flowing from the radiator to the fuel cell stack, and
    wherein, in the performing, the temperature reduction control is performed in which the flow rate of the coolant that is caused to flow through the fuel cell stack by the adjusting valve is increased so as to be higher than the flow rate before start of the control.

8. The method of operating the fuel cell vehicle according to claim 1, wherein,
    the fuel cell stack is cooled by a coolant, and
    the fuel cell system includes:
    a radiator configured to cool the coolant; and
    a circulation path and a cooling pump that are configured to circulate the coolant between the fuel cell stack and the radiator, and
    wherein, in the performing, the temperature reduction control is performed in which a rotation speed of the cooling pump is increased so as to be higher than the rotation speed before start of the control.

9. The method of operating the fuel cell vehicle according to claim 1, wherein,
    the fuel cell stack is cooled by a coolant, and
    the fuel cell system includes:
    a radiator configured to cool the coolant;
    a cooling fan configured to blow air to the radiator; and
    a circulation path and a cooling pump that are configured to circulate the coolant between the fuel cell stack and the radiator, and
    wherein, in the performing, the temperature reduction control is performed in which a rotation speed of the cooling fan is increased so as to be higher than the rotation speed before start of the control.

10. The method of operating the fuel cell vehicle according to claim 1, wherein,
    the fuel cell system includes:
    a humidifier configured to humidify one reactant gas of the oxygen-containing gas and the fuel gas to be supplied to the fuel cell stack;
    a bypass channel configured to guide the one reactant gas to the fuel cell stack while bypassing the humidifier; and
    a bypass valve provided in the bypass channel, and
    wherein, in the performing, the humidification control is performed in which the bypass valve is closed.

11. The method of operating the fuel cell vehicle according to claim 1, wherein, the fuel cell system includes:
a humidifier configured to humidify the oxygen-containing gas to be supplied to the fuel cell stack; and
an air pump configured to supply the oxygen-containing gas to the humidifier, and
wherein, in the performing, the humidification control is performed in which a supply amount of the oxygen-containing gas supplied by the air pump is decreased so as to be less than the supply amount before start of the control.

12. The method of operating the fuel cell vehicle according to claim 1, wherein,
in the performing, at least one of the temperature reduction control and the humidification control is performed even while the fuel cell vehicle is traveling on the uphill road.

13. A fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system, the fuel cell vehicle comprising:
one or more processors that execute computer-executable instructions stored in a memory, wherein the one or more processors execute the computer-executable instructions to cause the fuel cell vehicle to:
determine whether the fuel cell vehicle travels on an uphill road or not based on map information stored in a memory; and
if it is determined that the fuel cell vehicle travels on the uphill road, perform at least one of a temperature reduction control and a humidification control by a time the fuel cell vehicle reaches the uphill road, wherein the temperature reduction control is a control of reducing a temperature of the fuel cell stack so as to be less than the temperature before start of the temperature reduction control and the humidification control is a control of increasing a water content of the fuel cell stack so as to be greater than the water content before start of the humidification control.

* * * * *